United States Patent [19]

Grenier

[11] Patent Number: 5,480,174
[45] Date of Patent: Jan. 2, 1996

[54] DEFLECTOR FOR A TRAILER

[76] Inventor: Ronald I. Grenier, 5019-99 Street, Edmonton, Alberta, Canada, T6E 4Y1

[21] Appl. No.: 382,976

[22] Filed: Feb. 3, 1995

[51] Int. Cl.⁶ .................................................. B62D 25/16
[52] U.S. Cl. ................... 280/414.1; 280/851; 296/180.4
[58] Field of Search ................... 296/180.4, 181, 296/91; 280/847, 848, 851, 155, 159, 770, 414.1

[56] References Cited

U.S. PATENT DOCUMENTS

| 3,746,366 | 7/1973 | Bruce et al. | 280/851 |
| 3,913,967 | 10/1975 | Johnson et al. | 280/159 X |
| 4,157,200 | 6/1979 | Johnson | 296/180.4 X |
| 4,728,140 | 3/1988 | Lucht | 296/180.4 |
| 5,058,946 | 10/1991 | Faber | 296/181 |
| 5,121,944 | 6/1992 | Haddox | 280/851 X |
| 5,181,734 | 1/1993 | Brown | 280/851 X |

FOREIGN PATENT DOCUMENTS

| 687611 | 2/1964 | Canada | 296/14 |
| 1017772 | 9/1977 | Canada | 296/96 |
| 2038136 | 9/1992 | Canada | 296/11 |
| 2919466 | 12/1980 | Germany | 296/180.4 |

OTHER PUBLICATIONS

Products Preview, p. 96, published as early as Mar. of 1993—Aero-Shield.
Brochure by Dethmers Manufacturing Co.. published as early as Jan. of 1995—No. 6 Deflector—attaches to frame to protect towed vehicle.

*Primary Examiner*—Joseph D. Pape
*Attorney, Agent, or Firm*—Anthony R. Lambert

[57] ABSTRACT

A rock deflector for a trailer is described which includes a deflector shield having a top, a bottom, a first face and a second face. A first mounting bracket is pivotally secured to the bottom of the deflector shield, whereby the deflector shield is pivotally mounted in a transverse orientation to a neck of a trailer. A brace is provided having a first end and a second end. The first end is secured to the first face of the deflector shield. A second mounting bracket is secured to the second end of the brace, whereby the brace is mounted to a neck of a trailer.

6 Claims, 6 Drawing Sheets

DEFLECTOR FOR A TRAILER

FIELD OF THE INVENTION

The present invention relates to a deflector that attaches to a neck of an open sided trailer to deflect rocks coming off the wheels of the tow vehicle that otherwise would damage cargo being carried by the trailer.

BACKGROUND OF THE INVENTION

Open sided trailers are used to tow boats or cars behind vehicles, such as motor homes. Moulded fibre glass deflectors have been mounted to the necks of these trailers in order to improve their aerodynamics and to deflect rocks. However, the presence of a moulded fibre glass deflector on the neck of a trailer unavoidably limits the turning radius of the tow vehicle. As the tow vehicle turns, the angle between the tow vehicle and the neck of the trailer changes. An angle is eventually reached at which a rear bumper of the tow vehicle strikes the moulded fibre glass deflector.

SUMMARY OF THE INVENTION

What is required is an alternate form of deflector.

According to the present invention there is provided a deflector for a trailer which includes a deflector shield having a top, a bottom, a first face and a second face. A first mounting bracket is pivotally secured to the bottom of the deflector shield, whereby the deflector shield is pivotally mounted in a transverse orientation to a neck of a trailer. A brace is provided having a first end and a second end. The first end is secured to the first face of the deflector shield. A second mounting bracket is secured to the second end of the brace, whereby the brace is mounted to a neck of a trailer.

The deflector, as described above, avoids the problems associated with the moulded fibre glass deflectors. The deflector shield is placed as close as possible to a car or boat being hauled by the trailer, in order to protect the car or boat from rock damage. The deflector shield is positioned at an angle in order to deflect air under the trailer, thereby reducing wind resistance. The deflector shield is supported in its forwardly angled positioned by a forwardly extending brace. The brace is positioned on the same plane as the neck of the trailer and, therefore, does not limit the turning radius of the vehicle to any greater extent than does the neck of the trailer. It is preferred that the deflector shield be substantially planar. One form of construction involves having a deflector shield that includes a tubular support frame and a cover plate of a resilient material supported by the tubular support frame.

Although beneficial results may be obtained through the use of the rock deflector for a trailer, described above, the space provided in campgrounds is often extremely limited. When confronted with limited space, it is not unusual for an owner of a tow vehicle to slide the neck of the trailer under the rear end of the tow vehicle. Of course, this is not possible when a rock deflector is positioned on the neck of the trailer. Even more beneficial results may, therefore, be obtained when the second mounting bracket is detachably secured to the second end of the brace by means of a quick release form of coupling. This enables the brace to be released and the deflector shield pivoted to a substantially horizontal stored positioned parallel to the neck of the trailer. When the deflector shield is in the stored position, the neck of the trailer can be slid under the rear end of the tow vehicle.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
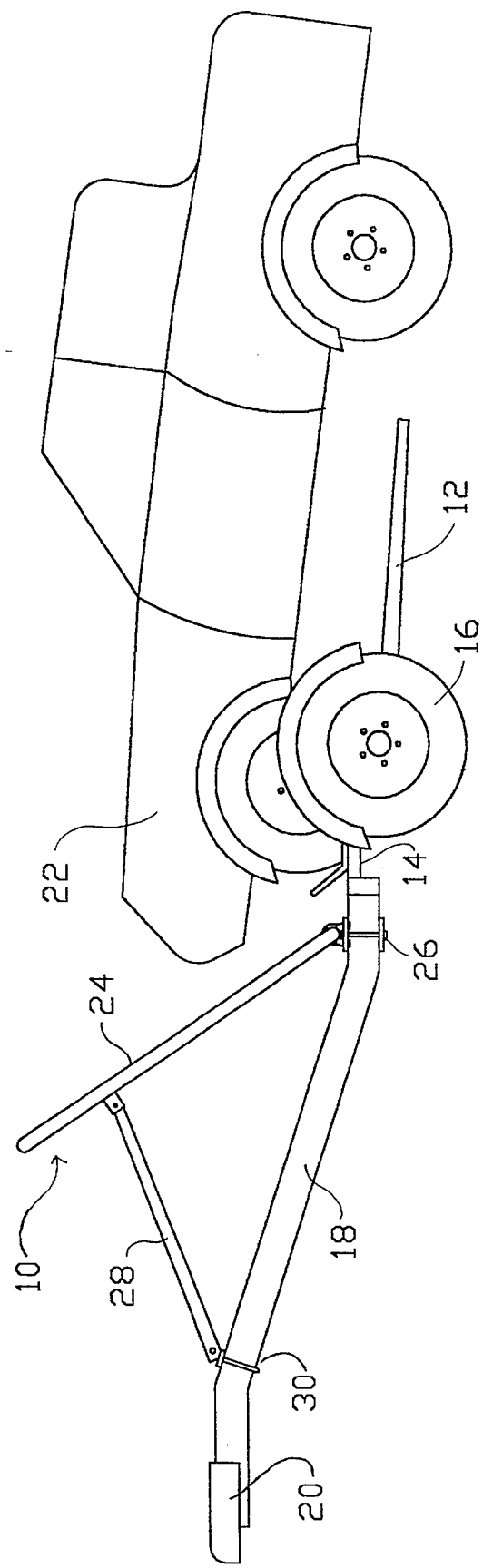
FIG. 1 is a side elevation view of a rock deflector mounted on a neck of a trailer.

The preferred embodiment, a deflector for a trailer generally identified by reference numeral 10, will now be described with reference to FIGS. 1 through 7.

Referring to FIG. 1, there is illustrated a trailer 12 to which deflector 10 is mounted. Trailer 12 includes a frame 14, ground engaging wheels 16 which are rotatably mounted to frame 14, and a forwardly extending neck 18 that supports a hitch 20. Trailer 12, as illustrated, is adapted for towing a car 22, behind a tow vehicle, (not shown). It is to be noted that trailer 12 is not enclosed, it has open sides that leave car 22 exposed to impact from rocks coming off the wheels of the tow vehicle.

Figure 2:
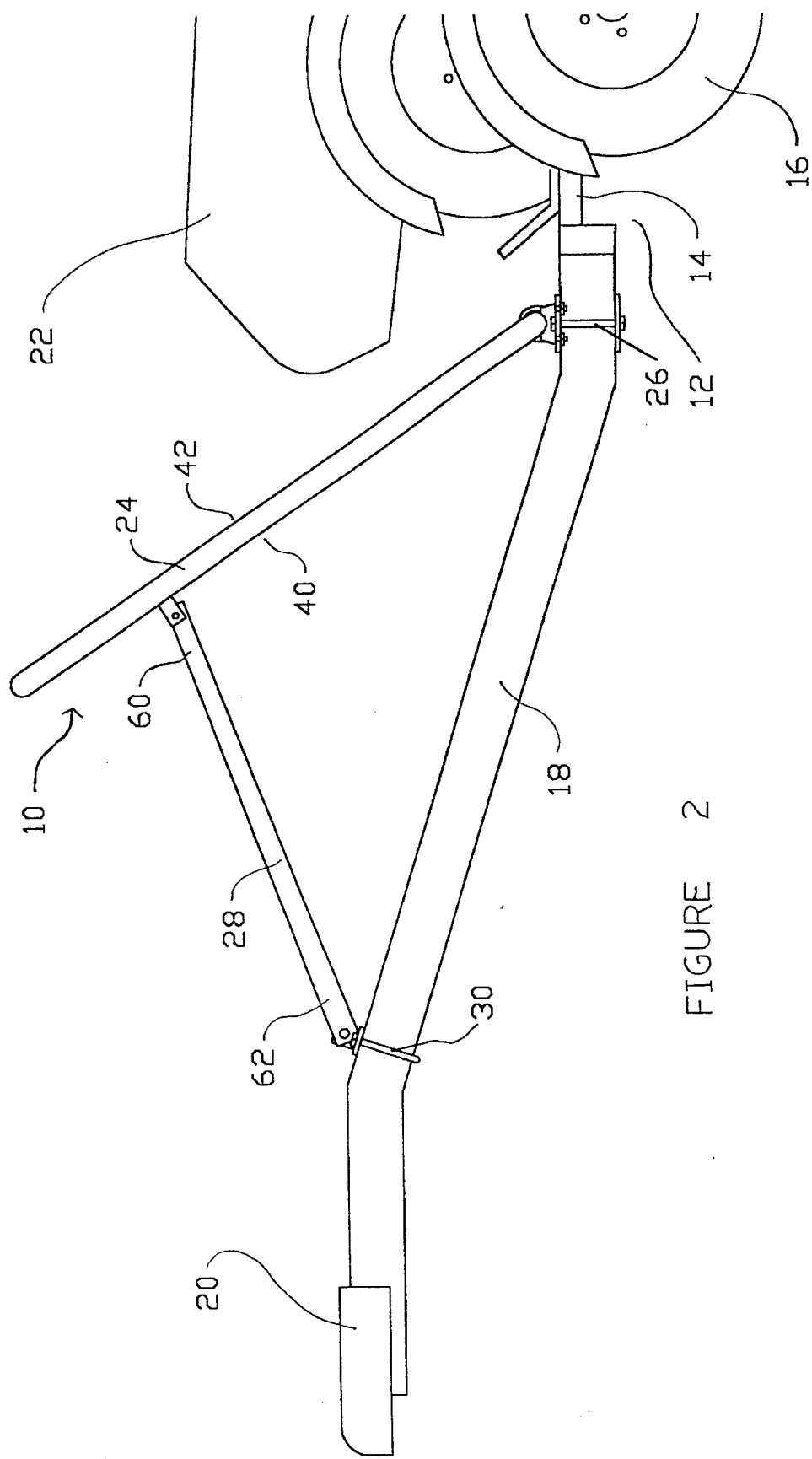
FIG. 2 is a detailed side elevation view of the rock deflector illustrated in FIG. 1.
Figure 4:
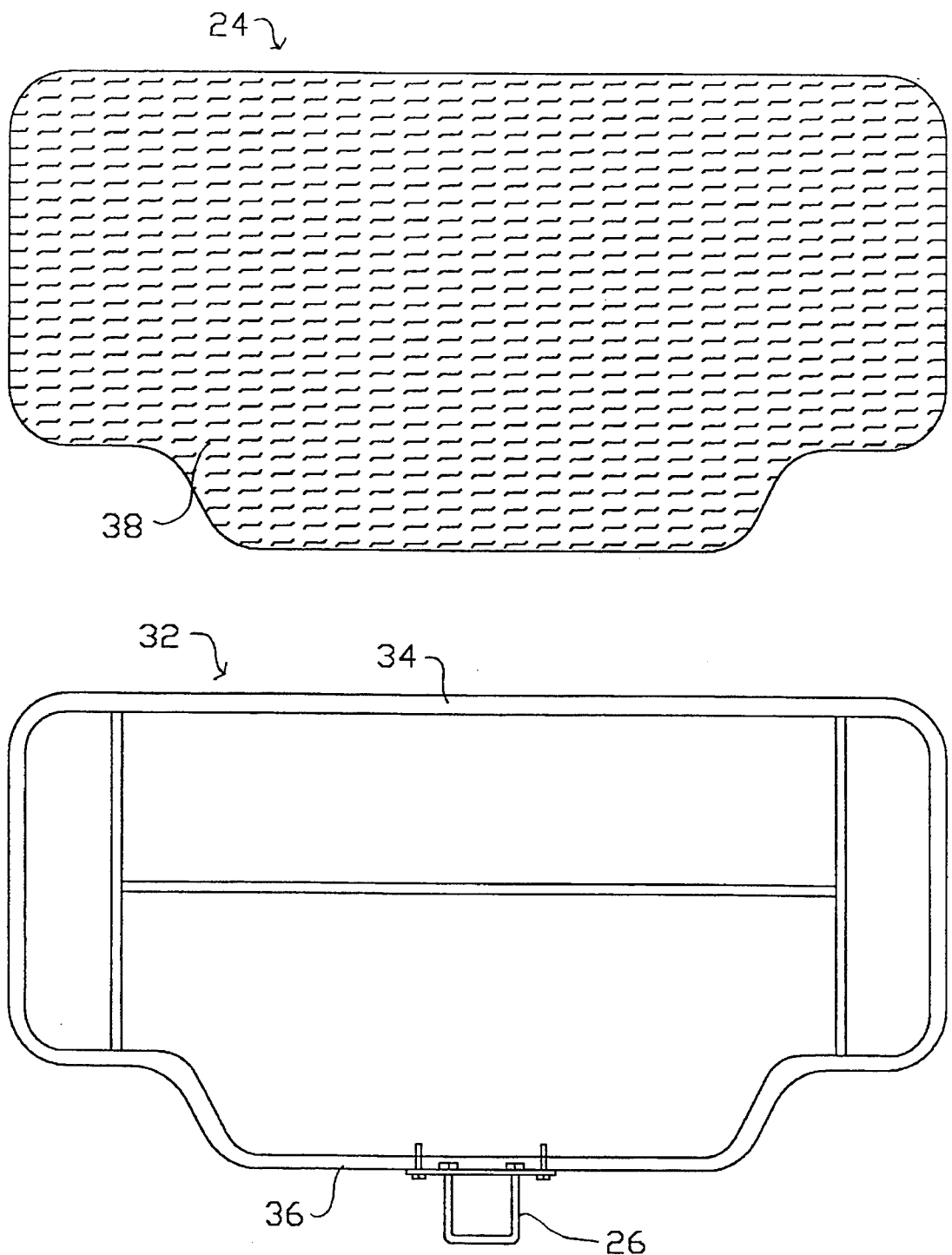
FIG. 4 is an exploded front elevation view of the deflector shield of the rock deflector illustrated in FIG. 1.
Figure 5:
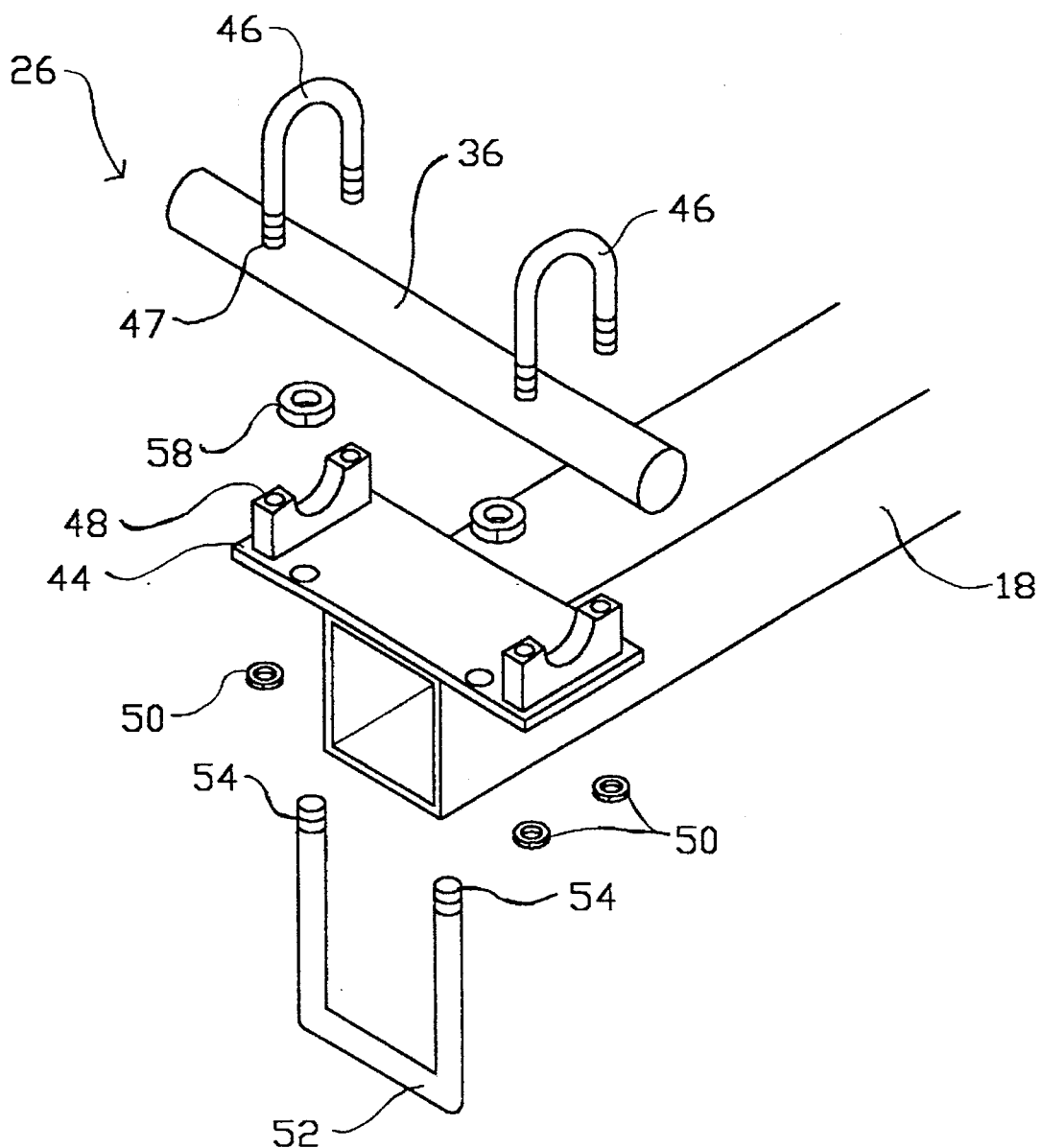
FIG. 5 is an exploded perspective view of the first mounting bracket of the rock deflector illustrated in FIG. 1.
Figure 6:
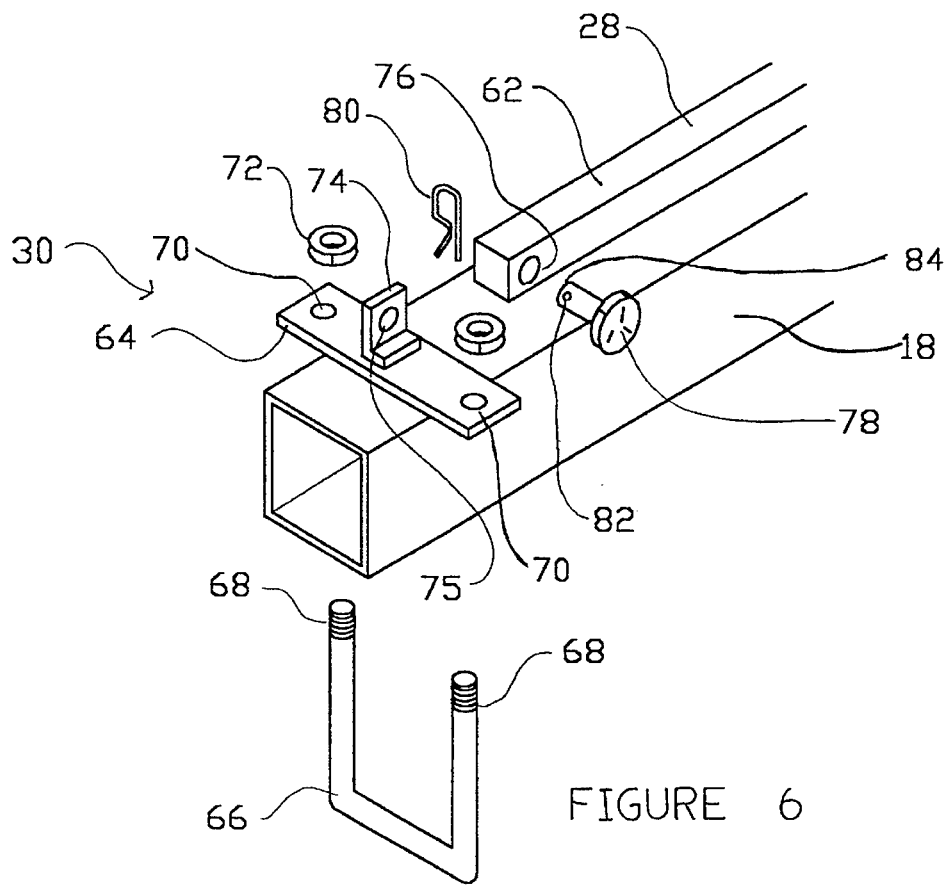
FIG. 6 is an exploded perspective view of the second mounting bracket of the rock deflector illustrated in FIG. 1.
Figure 7:
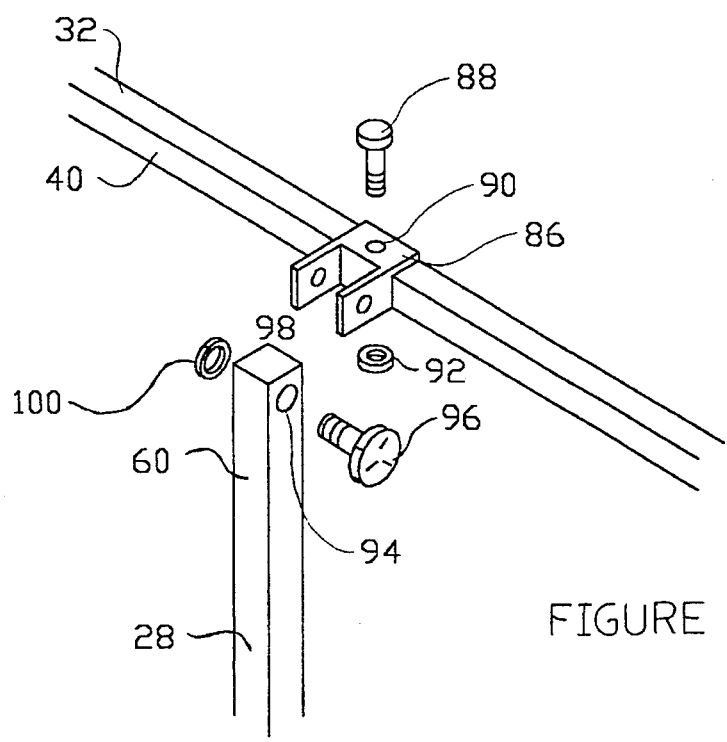
FIG. 7 is an exploded perspective view of the connection between the first end of the brace and the deflector shield of the rock deflector illustrated in FIG. 1.

Referring to FIG. 2, deflector 10 includes a deflector shield 24, a first mounting bracket 26, a brace 28 and a second mounting bracket 30. Referring to FIG. 4, deflector shield 24 includes a tubular support frame 32 having a top 34, a bottom 36, and a substantially planar cover plate 38 of a resilient vinyl material which is secured to and supported by tubular support frame 32. Referring to FIG. 2, deflector shield 24 can be identified as having a first face 40 and a second face 42. Referring to FIG. 4, first mounting bracket 26 is pivotally secured to bottom 36 of support frame 32 of deflector shield 24. Referring to FIG. 2, it can be seen how first mounting bracket 26 is used to pivotally secure deflector shield 24 in a transverse orientation to neck 18 of trailer 12. It is preferable that first mounting bracket 26 be positioned in such as manner as to place deflector shield 24 as close as practicable to car 22. Referring to FIG. 5, the components of first mounting bracket 26 are illustrated. These components include a cradle 44 in which bottom 36 of support frame 32 is received. A pair of small "U" shaped members 46 are used to prevent bottom 36 from separating from cradle 44. Ends 47 of "U" shaped members 46 extend through apertures 48 in cradle 44 and are secured by nuts 50 which prevent "U" shaped members from being withdraw. A larger "U" shaped member 52 is used to secure cradle 44 to neck 18 of trailer 12. Ends 54 of "U" shaped member 52 extend through holes 56 in cradle 44 and are secured by nuts 58. Neck 18 of trailer 12 is securely clamped between cradle 44 and "U" shaped member 52. In contrast, "U" shaped members 46 do not tightly clamp bottom of support frame 32 to cradle 44; thereby permitting pivotal movement of deflector shield 24 relative to neck 18 of trailer 12. Referring to FIG. 2, brace 28 has a first end 60 and a second end 62. First end 60 is pivotally secured to first face 40 of deflector shield 24, second end 62 is secured to second mounting bracket 30. Referring to FIG. 6, second mounting bracket 30 includes a generally "T" shaped member 64. "T" shaped member 64 is clamped to neck 18 of trailer 12 by means of a "U" shaped member 66. Ends 68 of "U" shaped member 66 extend through apertures 70 in "T" shaped member 64 and are securely in position by nuts 72. "T" shaped member 64 has an upstanding tab 74 with an aperture 75 extending therethrough. Second end 62 of brace 28 has an aperture 76. Second end 62 of brace 28 is detachably secured to tab 74 by means of a quick release form of coupling which includes a pin 78 which is extended through aperture 76 in brace 28 and aperture 75 of tab 74. Pin 78 is prevented from being withdrawn from apertures 75 and 76 by a spring wire clip 80 (or alternatively a cotter pin), that extends through a hole 82 at remote end 84 of pin 78. Referring to FIG. 7, there is illustrated the connection between first end 60 of brace 28 and first face 40 of deflector shield 24. A "U" shaped member 86 is attached to support frame 32 by means of a bolt 88, that extends through an aperture 90 in "U" shaped member 86, as well as an aligned aperture (not shown) in support frame 32 and is secured by a nut 92. First end 60 of brace 28 has an aperture 94 extending therethrough. First end 60 of brace 28 is secured to "U" shaped member 86 by means of a bolt 96 which extends through aligned apertures 98 in "U" shaped member 86 and aperture 94 in first end 60 of brace 28 and is secured by a nut 100.

Figure 3:
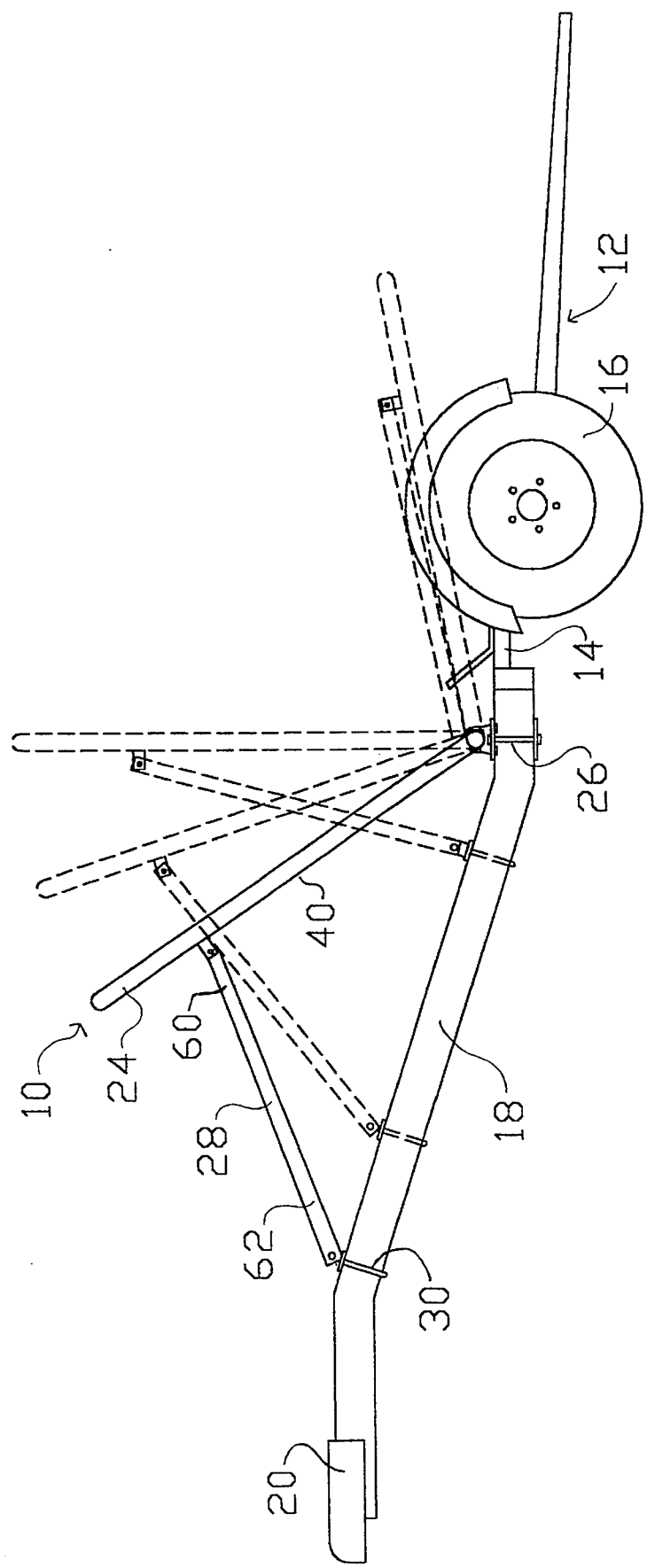
FIG. 3 is a side elevation view of the rock deflector illustrated in FIG. 1, showing alternate angular positioning.

The use and operation of deflector 10 will now be described with reference to FIGS. 1 through 7. Referring to FIG. 2, deflector 10 is illustrated in a forwardly angled operative position. In this operative position, air is deflected downward to improve the aerodynamics of trailer 12 and car 22 is protected from rocks or similar projectiles from the wheels of the tow vehicle. Referring to FIG. 3, it can be seen that the angular positioning of deflector shield 24 is determined by the placement of second mounting bracket 30 along neck 18 of trailer 12. An angular adjustment may be required to provide maximum protection and maximum turning radius depending upon such factors as the length of neck 18 of trailer 12, the type of tow vehicle, or the type of cargo carried by trailer 12. FIG. 3 also illustrates deflector shield 24 laid in a substantially horizontal stored position. Referring to FIG. 6, this is accomplished by removing spring wire clip 80 from hole 82 at remote end 84 of pin 78. This enables pin 78 to be withdrawn from aperture 76 in brace 28 and aperture 75 of tab 74. With pin 78 removed, second end 62 of brace 28 is released, and first mounting bracket 26 allows deflector shield 24 to be freely pivoted into the position illustrated in FIG. 3.

It will be apparent to one skilled in the art that modifications may be made to the illustrated embodiment without departing from the spirit and scope of the invention as hereinafter defined in the claims.

I claim:

1. A rock deflector for a trailer, comprising:
    a deflector shield having a top, a bottom, a first face and a second face;
    a first mounting bracket pivotally secured to the bottom of the deflector shield, whereby the deflector shield is pivotally mounted in a transverse orientation to a neck of the trailer;
    a brace having a first end and a second end, the first end being secured to the first face of the deflector shield; and
    a second mounting bracket secured to the second end of the brace, whereby the brace is mounted to the neck of the trailer.

2. The rock deflector for a trailer as defined in claim 1, wherein the deflector shield is substantially planar.

3. The rock deflector for a trailer as defined in claim 1, wherein the deflector shield includes a tubular support frame and a cover plate of a resilient material supported by the tubular support frame.

4. The rock deflector for a trailer as defined in claim 1, wherein the second mounting bracket is detachably secured to the second end of the brace by means of a quick release form of coupling.

5. A rock deflector for a trailer, comprising:
    a deflector shield including a tubular support frame having a top, a bottom, a first face and second face, with a substantially planar cover plate of a resilient material supported by the tubular support frame;
    a first mounting bracket pivotally secured to the bottom of the support frame of the deflector shield, whereby the deflector shield is pivotally mounted in a transverse orientation to a neck of the trailer;
    a brace having a first end and a second end, the first end being pivotally secured to the first face of the deflector shield;
    a second mounting bracket detachably secured by a quick release form of coupling to the second end of the brace, whereby the brace is detachably mounted to the neck of the trailer.

6. In combination:
    a. a trailer having at least two ground engaging wheels, open sides and a forwardly extending neck that supports a hitch; and
    b. a rock deflector for a trailer, comprising:
        a deflector shield pivotally mounted in a transverse orientation to the neck of the trailer, the deflector shield having a first face which faces the hitch of the trailer and a second face, and
        a brace having a first end and a second end, the first end being secured to the first face of the deflector shield, the second end being secured to the neck of the trailer, thereby securing the deflector shield in an operative position in which the deflector shield extends upwardly from the neck of the trailer and is angled forwardly toward the hitch.

* * * * *